United States Patent [19]

Shibata et al.

[11] Patent Number: 4,556,917
[45] Date of Patent: Dec. 3, 1985

[54] MAGNETIC RECORDING/REPRODUCING APPARATUS FOR VIDEO AND SOUND

[75] Inventors: Akira Shibata; Keiichi Komatsu, both of Katsuta, Japan

[73] Assignee: Hitachi, Ltd., Tokyo, Japan

[21] Appl. No.: 466,479

[22] Filed: Feb. 15, 1983

[30] Foreign Application Priority Data

Feb. 17, 1982 [JP] Japan ................................ 57-22701

[51] Int. Cl.[4] ............................................. H04N 5/78
[52] U.S. Cl. ................................... 358/343; 360/19.1
[58] Field of Search ............... 358/310, 330, 343, 335; 360/18, 19.1, 20

[56] References Cited

U.S. PATENT DOCUMENTS 4,005,474 1/1977 Keizer .................................. 358/330
4,170,022 10/1979 Kretschmer et al. ............ 358/343 X Primary Examiner—Robert L. Richardson
Attorney, Agent, or Firm—Antonelli, Terry & Wands

[57] ABSTRACT

Disclosed is a magnetic recording/reproducing apparatus, in which a luminance signal and a carrier chrominance signal are separated from a composite color video signal, a luminance carrier signal is frequency-modulated with the luminance signal, a frequency of a subcarrier signal of the carrier chrominance signal is frequency-converted into a low band frequency so as to dispose the carrier chrominance signal in the frequency band lower than the lower side band of the luminance signal, a sound carrier signal is frequency-modulated with an aural signal, the aural signal is disposed in the frequency band between the luminance signal and the carrier chrominance signal, and the video signal and the aural signal are frequency-multiplexed and recorded. A comb line filter is inserted in a recording luminance signal processing circuit for separating the luminance signal from the composite color video signal and for processing the luminance signal.

8 Claims, 11 Drawing Figures

MAGNETIC RECORDING/REPRODUCING APPARATUS FOR VIDEO AND SOUND

The present invention relates to a magnetic recording/reproducing apparatus for recording a color video signal onto a magnetic recording medium and for reproducing the recorded signal, and particularly to a recording/reproducing apparatus for frequency-multiplexing a color video signal with an aural signal to record the multiplexed signals onto a video track of a magnetic recording medium.

In a magnetic recording/reproducing apparatus for recording a color video signal such as a color television signal onto a magnetic tape and for reproducing a color video signal recorded on a magnetic tape, a video signal and an aural signal are recorded on individual respective recording tracks. That is, a video signal is recorded by a rotary video head onto a video track provided on a magnetic tape perpendicularly or obliquely with respect to the longitudinal or travelling direction of the tape, while an aural signal is recorded by a fixed audio head onto an audio track provided on the magnetic tape at its upper or lower edge in its longitudinal direction.

In such a magnetic recording/reproducing apparatus, if the travelling speed of a magnetic tape is reduced to increase the recording density to make it possible to perform long time recording/reproducing, a problem is caused as follows:

In order to reduce the travelling speed of a magnetic tape, it is necessary to reduce the rotary speed of a capstan motor or a capstan shaft, so that a fly-wheel attached to the capstan motor or the capstan shaft can not sufficiently exhibit its function to cause unevenness in the travelling speed of the magnetic tape to thereby deteriorate the wow flutter characteristic. Further, since the travelling speed of the magnetic tape is reduced, the relative speed between the fixed audio head and the magnetic tape is lowered to reduce the frequency band of aural signal to make it impossible to record/reproduce an aural signal in a high frequency range.

Therefore, it has been tried to convert an aural signal into an aural FM signal and then frequency-multiplex the aural FM signal with a video signal, so that the aural signal and the video signal can be recorded by the same rotary video head onto a video track. In such a magnetic recording/reproducing apparatus, a luminance signal and a carrier chrominance signal are separated out from a color video signal. A carrier signal is frequency-modulated with the luminance signal to obtain a frequency-modulated luminance signal and the frequency of a chrominance subcarrier of the carrier chrominance signal is converted into a low frequency. The low band converted carrier chrominance signal is placed in the frequency band lower than the lower side band of the luminance signal. An audio carrier signal is frequency-modulated with the aural signal and the frequency-modulated aural signal is placed between the lower side band of the luminance signal and the upper side band of the carrier chrominance signal. The thus frequency-multiplexed composite signal is recorded onto a video track on a magnetic tape by a rotary video head.

In a recording/reproducing apparatus for domestic use, the frequency band of the signal which can be recorded onto a magnetic tape is narrow and therefore when an aural signal is frequency-multiplexed with a video signal, it is necessary to dispose the respective bands of the carrier chrominance signal, the aural signal and the luminance signal closely to each other, with the result that the aural signal interfers the video signal and vice versa or the frequency band of the luminance signal is made narrow to deteriorate the picture quality in reproducing. For example, there may occur intermodulation distortion between the luminance signal and the aural signal due to the non-linearity of the video head and the magnetic tape, so that a second harmonic signal of the aural signal may be mixed in the band of the luminance signal to appear, in reproducing, as noises in a picture of a television receiver. Further, a part of a signal in the lower side band of the aural signal may be mixed in the upper side band of the carrier chrominance signal to generate a beat between the aural signal and the carrier chrominance signal to thereby interfer, in reproducing, the chrominance signal. Furthermore, the carrier chrominance signal may be mixed in the lower side band of the aural signal to deteriorate the tone quality. When a luminance signal and a carrier chrominance signal are separated from a composite color television signal, the composite color television signal is usually fed to a low-pass filter and a band-pass filter, so that the luminance signal is derived at an output terminal of the low-pass filter and the carrier chrominance signal is obtained at an output terminal of the band-pass filter. However, each of the low-pass and band-pass filters has a gentle attenuation cut-off-frequency characteristic and therefore in many cases the carrier chrominance signal remains in the luminance signal. On the other hand, the amplitude of the luminance signal in its high frequency region is emphasized to improve the S/N ratio prior to recording and then fed to a recording circuit of the apparatus. Accordingly, the amplitude of the residual carrier chrominance signal in the luminance signal is also greatly emphasized and the thus emphasized carrier chrominance signal is mixed in the upper side band of the aural signal to deteriorate the tone quality of the aural signal. Further, a luminance signal may cause an aural signal to be reproduced with a buzz noise. That is, the amplitude of a luminance signal recorded on a magnetic tape is smaller in its high frequency region than that in its low frequency region due to the frequency characteristic of the magnetic tape and magnetic head. In the reproducing operation, therefore, peaking is provided in the high frequency band of a luminance signal to increase the signal amplitude in the high frequency band so as to improve the S/N ratio. As the peaking circuit, for example, a resonance circuit constituted by a capacitance and an inductance is utilized. If peaking is provided in the high frequency band of the luminance signal in reproducing, the signal in the low frequency band of the luminance signal is attenuated owing to the characteristic of the peaking circuit. Therefore, in the recording operation, low frequency compensation is performed so that the signal amplitude in the low frequency band of the luminance signal becomes larger than that in the high frequency band. Accordingly, in recording, the recording current of the luminance signal flowing in the video head is large at the synchronous tip in the low frequency band, while small at the white peak level in the high frequency band. When an aural signal is frequency-multiplexed with a luminance signal to recorded the multiplexed signal onto a magnetic tape, the recording current of the luminance signal functions as a bias current for the aural signal. Accordingly, if the recording current of the luminance signal at the synchronous tip is different from that at the white peak level, this difference may affect the aural signal. Particularly, the phase of the frequency-modulated aural signal is suddenly changed at the synchronous tip due to the abrupt increase or decrease of the recording current at this portion, so that this change is reproduced as a video buzz noise.

As described above, the problems caused in the case where the frequency-multiplexed signal of an aural signal and a luminance signal are recorded may be summarized as follows:

(1) The reduction of video signal band width due to the frequency-multiplexing of frequency-modulated aural signal deteriorates the picture quality;
(2) The chrominance signal component contained in the lower side band of the frequency-modulated luminance signal may be mixed into the frequency-modulated aural signal so as to interfere the aural signal;
(3) The amplitude-modulated component of the frequency-modulated luminance signal may cause video buzz interference of the aural signal.

An object of the present invention is to provide a magnetic recording/reproducing apparatus in which an aural signal and a video signal are frequency-multiplexed and the multiplexed signal is recorded onto the same track under the condition that the interference from the video signal to the aural signal is suppressed to thereby obtain good quality in sound as well as in picture.

According to the present invention, a comb line filter is inserted in a luminance signal processing circuit in which a luminance signal is separated from a composite color video signal and a luminance carrier signal is frequency-modulated, so as to prevent a carrier chrominance signal from remaining in the luminance signal to reduce the interference given by the video signal to the aural signal. Further, the luminance signal processing circuit is provided with such a property that the recording current of the luminance signal has a flat amplitude characteristic so as to prevent video buzz noises from occurring in the aural signal.

The foregoing object and other objects as well as the characteristic features of the present invention will become more apparent and more readily understandable by the following description and the appended claims when read in conjunction with the accompanying drawings, in which:

Figure 1:
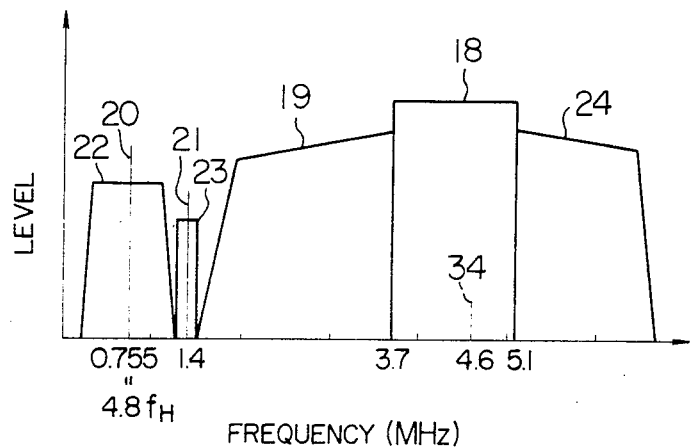
FIG. 1 is a frequency spectrum diagram of a composite video signal recorded/reproduced in the magnetic recording/reproducing apparatus according to the present invention.

FIG. 1 shows an example of a frequency spectrum of a video signal and an aural signal recorded in the magnetic recording/reproducing apparatus according to the present invention. In FIG. 1, the frequency of a chrominance subcarrier signal 20 of a carrier chrominance signal is selected to be 755 kHz and a side band 22 of the carrier chrominance signal has a frequency band of ±500 kHz with the chrominance subcarrier frequency as its center frequency. The center frequency of a sound carrier signal 21 of an aural signal is selected to be 1.4 MHz and a side band 23 of the aural signal has a frequency band of ±100 kHz with its center frequency 1.4 MHz. The center frequency of a luminance carrier signal 18 of a luminance signal is selected to be 4.4 MHz and the frequency deviation of the luminance carrier signal 18 is selected to be 3.7 MHz at the synchronous tip of a synchronizing signal and 5.1 MHz at the white peak of the same. The lower limit frequency of a lower side band 19 of the luminance signal is selected to be 1.5 MHz. Reference numeral 24 denotes an upper side band of the luminance signal.

The carrier chrominance signal 22 is separated from the luminance signal 19 and the subcarrier signal thereof is frequency-converted to dispose its frequency at 755 kHz in the low band. The luminance signal 19 is obtained by frequency-modulating the luminance carrier signal 18. The aural signal 23 is obtained by frequency-modulating the sound carrier signal 21 and disposed between the upper side band of the carrier chrominance signal 22 and the lower side band 19 of the luminance signal.

Figure 2:
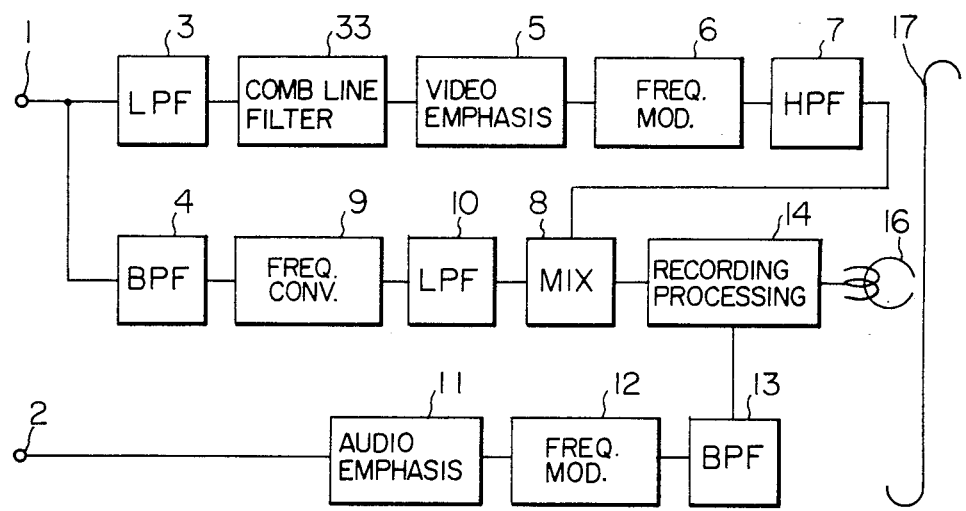
FIG. 2 is a block diagram illustrating an embodiment of the recording circuit in the magnetic recording/reproducing apparatus according to the present invention.

FIG. 2 is a block diagram illustrating an embodiment of the recording circuit in the magnetic recording/reproducing apparatus according to the present invention, in which recording circuit a recording signal as shown in FIG. 1 is formed from a composite color television signal to be recorded onto a magnetic tape. In FIG. 1, a video signal of the composite color television signal is fed to an input terminal 1 and an aural signal is fed to another input terminal 2. The input terminal 1 is connected to an input terminal of a low-pass filter 3 and an input terminal of a band-pass filter 4. The low-pass filter 3 serves to derive a luminance signal component from the composite color television signal and the cut-off frequency thereof is selected to a value in the vicinity of the lower limit frequency of the lower side band of the carrier chrominance signal. The output terminal of the low-pass filter 3 is connected to an input terminal of a comb line filter 33 which is in turn connected at its output terminal to an input terminal of a video emphasis circuit 5. The comb line filter 33 serves to remove the residual chrominance signal in the luminance signal derived through the low-pass filter 3. The video emphasis circuit 5 serves to improve the S/N ratio of the high band component of the luminance signal and has a dynamic emphasis characteristic in which the amount of emphasis changes in accordance with the signal level of the high band component of the luminance signal. The video emphasis circuit 5 is connected at it output terminal to an input terminal of a first frequency modulator 6 so as to frequency-modulate the carrier signal with the luminance signal. The first frequency modulator 6 is connected at its output terminal to an input terminal of a high-pass filter 7 through which only the luminance signal frequency-modulated by the high-pass filter 7 is derived and fed to an input terminal of a mixing circuit 8 with unnecessary noises of lower frequency than the deleted luminance signal.

The band-pass filter 4 serves to derive the carrier chrominance signal from the composite color television signal and is connected at its output terminal to an input terminal of a frequency converter 9. The frequency converter 9 contains therein a local oscillator so that the oscillation signal of the local oscillator and the carrier chrominance signal are mixed to form two carrier chrominance signals respectively having frequencies which are the sum and difference between the oscillation frequency of the local oscillator and the frequency of the subcarrier of the carrier chrominance signal. The frequency converter 9 is connected at its output terminal to an input terminal of a low-pass filter 10 through which the carrier chrominance signal having the difference frequency is derived. The low-pass filter 10 is connected at its output terminal to a second input terminal of the mixing circuit 8.

The input terminal 2 is connected to an input terminal of an audio emphasis circuit 11 so that the amplitude of the high band component of the aural signal is emphasized in the audio emphasis circuit 11. The audio emphasis circuit 11 is connected at its output terminal to an input terminal of a second frequency modulator 12 so as to frequency-modulate the carrier signal with the aural signal. The second frequency modulator 12 is connected at its output terminal to a band-pass filter 13 in which noises outside the band of the aural signal are removed. The band-pass filter 13 is connected at its output terminal to a third input terminal of the mixing circuit 8. The mixing circuit 8 mixes the luminance signal fed from the high-pass filter 7, the carrier chrominance signal fed from the low-pass filter 10 and the aural signal fed from the band-pass filter 13 so as to form a composite video signal having the frequency spectrum as shown in FIG. 1. The mixing circuit 8 is connected at its output terminal to an input terminal of a recording processing circuit 14 in which the composite video signal fed thereto is amplified to an optimal recording signal level and then applied to a video head 16. The video head 16 is a rotary video head attached to the outer periphery of a rotary drum (not shown) and serves to record the composite video signal on to a magnetic tape 17 wound over 180 degrees around the periphery of the rotary drum.

Figure 3:
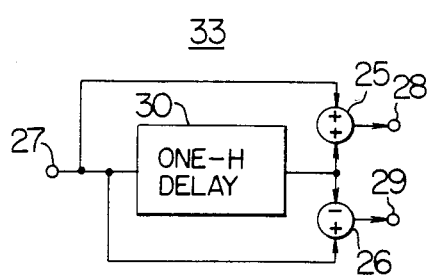
FIG. 3 is a circuit diagram of a comb line filter.
Figure 4:
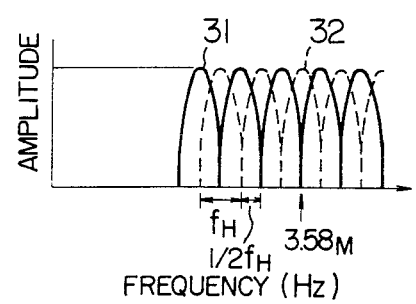
FIG. 4 is a graph illustrating the frequency-amplitude characteristic of the comb line filter.

In the recording circuit shown in FIG. 2, obtained is a composite video signal, which is the video signal multiplexed with the aural signal, as shown in FIG. 1. In the recording circuit shown in FIG. 2, the luminance signal and the carrier chrominance signal of the composite color television signal are separated through the low-pass filter 3 and the band-pass filter 4. Although the low-pass filter 3 deletes the carrier chrominance signal which is frequency-interleaved in the high frequency band of the luminance signal, the carrier chrominance signal can not be completely deleted because the low-pass filter 3 has a gentle cut-off frequency characteristic, so that the carrier chrominance signal remains a little in the luminance signal. Accordingly, if the amplitude of the luminance signal at the high band frequency is emphasized in the video emphasis circuit 5, the amplitude of the residual carrier chrominance signal in the luminance signal is amplified and this carrier chrominance signal is mixed into the frequency band of the frequency-modulated aural signal to interfere the aural signal. To eliminate this disadvantage, the comb line filter 33 is inserted between the low-pass filter 3 and the video emphasis circuit 5. The comb line filter 33 has such a circuit configuration as shown in FIG. 3 and is constituted by a one-H delay line 30 (H represents horizontal scanning period), an adder 25 and a subtracter 26. An input terminal 27 connected to the output terminal of the low-pass filter 3 of FIG. 2 is also connected to an input terminal of the one-H delay line 30. The input terminal 27 is further connected to one input terminal of the adder 25 and one input terminal of the subtracter 26. The one-H delay line 30 is connected at its output terminal to the other input terminal of the adder 25 and to the other input terminal of the subtracter 26. The one-H delay line 30 serves to cause the luminance signal applied to the input terminal 27 to be delayed by one horizontal period and feed the delayed luminance signal to the adder 25 and the subtracter 26. Accordingly, the adder 25 adds the luminance signal delayed by one horizontal scanning period and the luminance signal directly fed from the input terminal 27 and produces the resultant luminance signal from its output terminal 28. Since the carrier chrominance signal frequency-interleaved in the luminance signal is inserted in the spectra of the luminance signal, in order to derive the luminance signal, it will do to use a comb line filter having a frequency/amplitude characteristic such that the amplitude is maximum at the frequency which is integer times as large as the horizontal scanning frequency and zero at the frequency which is odd number times as large as half the horizontal scanning frequency. This can be attained by the circuit configuration in which the one-H delay line 30 and the adder 25 are connected as shown in FIG. 3 and which has a frequency characteristic as shown by a solid line 31 in FIG. 4. In order to derive the chrominance signal from the luminance signal, it will do to use a comb line filter having a frequency/amplitude characteristic such that the amplitude becomes maximum at the frequency which is odd number times as large as half the horizontal scanning frequency and zero at the frequency which is integer times as large as the horizontal scanning frequency. This can be attained by the circuit configuration composed by the one-H delay line 30 and the subtracter 26 as shown in FIG. 3 and the carrier chrominance signal can be derived from an output terminal 29. The comb line filter from which this carrier chrominance signal is derived has such a frequency characteristic as shown in FIG. 4 by a dotted line 32. The output terminal 29 is connected to the input terminal of the video emphasis circuit 5. Accordingly, the luminance signal fed to the video emphasis circuit 5 does not contain the carrier chrominance signal and the interference to the aural signal can be prevented. In order to have the frequency characteristic as shown in FIG. 4, the frequency band of the comb line filter 33 may be the frequency band of the carrier chrominance signal contained in the composite color television signal. Further, by using the comb line filter 33, the cut-off frequency of the low-pass filter 3 can be made high. This is because even if the carrier chrominance signal which can not be deleted by the low-pass filter 3 increases, this carrier chrominance signal can be deleted by the comb line filter 33. In this manner, the frequency band of the luminance signal is widened so as to improve in picture quality in reproducing.

The comb line filter 33 may be disposed in the stage before the low-pass filter 3 or behind the same. When the comb line filter 33 is disposed before the low-pass filter 3, the output of the chrominance signal processing system may be disposed behind the comb line filter 33. In this case, it will do to connect the input terminal of the band-pass filter 4 to the output terminal 29 in FIG. 3. Further, the comb line filter 33 may be utilized also as the chrominance processing circuit in reproducing. The recording current of the luminance signal has an amplitude deviation component due to the recording low band emphasis characteristic and therefore there occurs video buzz interference. This video buzz interference can be obviated by making the recording current characteristic flat. However, flattening the recording current characteristic may cause deterioration in S/N ratio in the picture quality and therefore a countermeasure to this defect should be provided. In order to make the recording current characteristic flat, in the circuit configuration of FIG. 2, the luminance signal processing circuit composed by the low-pass filter 3, the comb line filter 33, the video emphasis circuit 5, the first frequency modulator 6 and the high-pass filter 7 has a frequency characteristic such that the amplitude characteristic of the frequency band corresponding to the synchronous tip and the white peak of the synchronizing signal is flat.

In order to improve the S/N ratio, the following countermeasures may be considered:

(1) The frequency deviation of the luminance signal is widened; and (2) The amount of emphasis is increased.

To widen the frequency deviation, there is a problem that the carrier frequency band is widened due to the widening of the frequency deviation and the amount of lower band of the luminance signal mixed into the frequency band of the aural signal increases. To solve this problem, therefore, it is necessary to make the carrier center frequency of the luminance signal higher at the same time as the widening of the frequency deviation. Taking this problem into consideration, the frequency arrangement has been made as shown in the frequency spectrum in FIG. 1. That is, the frequency deviation of the luminance signal, which has been selected to be 1 MHz in the conventional recording/reproducing apparatus of the VHS system, is widened to 1.4 MHz and the frequencies at the synchronous tip and the white peak are also made higher from 3.4 MHz and 4.4 MHz to 3.7 MHz and 5.1 MHz respectively. At the same time, the frequency of the subcarrier of the carrier chrominance signal is also made higher about to 755 kHz to make the band wide and the center frequency of the carrier of the aural signal is correspondingly set to 1.4 MHz. As the result, the band of the video signal is widened by 50%. That is, the width from the white level 34 (FIG. 1) to the band of the aural signal becomes about 3.1 MHz to thereby distinguishably improve the picture quality.

Figure 5:
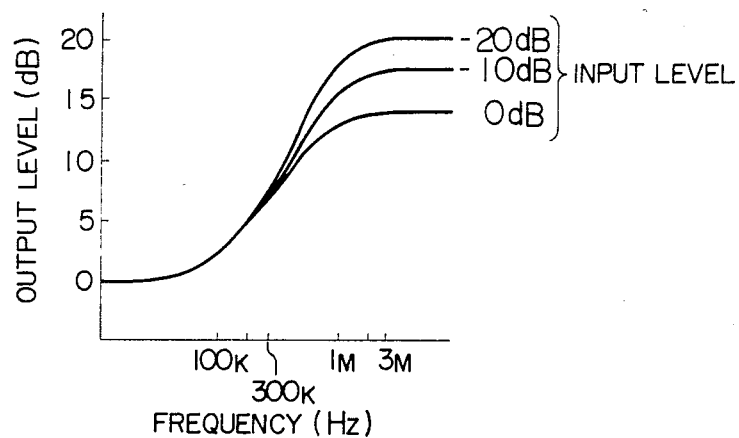
FIG. 5 is a graph illustrating the frequency characteristic of a video emphasis circut in the recording circuit shown in FIG. 2.

Next, the method of improving the S/N ratio by increasing the amount of emphasis in the video emphasis circuit 5 will be described. Although the S/N ratio may be improved if the emphasis amount is increased, the clip level at the white clipping point has to be made high to prevent the distortion of the wave shape and therefore the carrier frequency at the white clipping point becomes high, resulting in edge noises and reversing phenomena. Accordingly, the video emphasis circuit 5 is caused to have the dynamic emphasis characteristic as shown in FIG. 5. The dynamic emphasis characteristic has the following features:

(1) The S/N ratio can be improved at portions at which there are many low level signals and noises are apt to stand up; and (2) Since the emphasis amount is small with respect to high level signals, the amount of signals lost by clipping is small.

Thus, a reproduced picture in which the S/N ratio is not deteriorated can be obtained even if the recording current characteristic is made flat.

Figure 6:
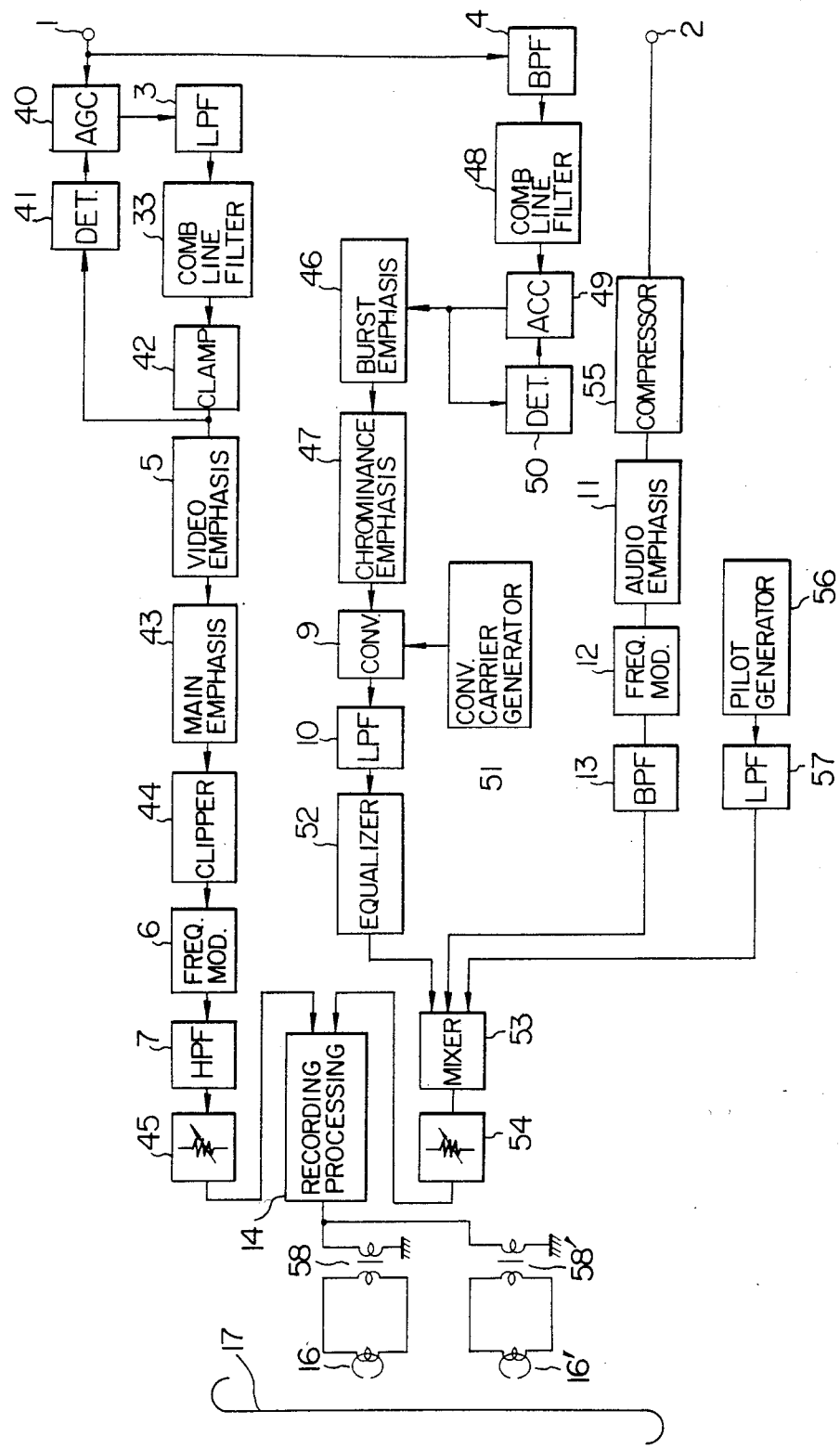
FIG. 6 is a block diagram illustrating another embodiment of the recording circuit in the magnetic recording/reproducing apparatus according to the present invention.

FIG. 6 shows another embodiment of the recording circuit in the magnetic recording/reproducing apparatus according to the present invention. In FIG. 6, a composite color television signal is fed to an input terminal 1 and an aural signal is fed to an input terminal 2. The composite color television signal fed to the input terminal 1 is then applied to an automatic gain control circuit 40. The amplification gain of the automatic gain control circuit 40 is controlled by an output signal of an amplitude detector 41 to cause the amplitude of the composite color television signal to be a predetermined value. The composite color television signal amplified by the automatic gain control circuit 40 is then fed to a low-pass filter 3 so that a luminance signal is derived thereat from the composite color television signal. The luminance signal derived at the low-pass filter 3 is fed to a comb line filter 33 through which a residual carrier chrominance signal which could not be deleted by the low-pass filter 3 is removed. The luminance signal passed through the comb line filter 33 is fed to a clamping circuit 42 and clamped so that the forward end, namely the synchronous tip, of a synchronizing signal is made to be a predetermined potential. The luminance signal, the synchronous tip of the synchronizing signal of which has been arranged to be the predetermined value, is fed to a video emphasis circuit 5 and the amplitude detector 41. The amplitude detector 41 detects the amplitude of the luminance signal produced at the output terminal of the clamping circuit 42 so as to produce a control signal having a magnitude according to the detected amplitude and feed it to the automatic gain control circuit 40. The video emphasis circuit 5 is a dynamic emphasis circuit having the characteristic as shown in FIG. 5 so that it emphasizes the amplitude of the high band component of the luminance signal and functions such that the smaller the signal level of the luminance signal becomes the more the emphasis amount increases. The video emphasis circuit 5 is connected at its output to an input terminal of a main emphasis circuit 43 and the dynamic-emphasized signal is further emphasized. The main emphasis circuit 43 has a frequency characteristic as shown by a curve 57 in FIG. 7 and emphasizes the signal level at frequencies above about 1 MHz by a predetermined value. Since there occurs an overshoot or an undershoot at a portion of the emphasized luminance signal where the amplitude thereof changes abruptly, the luminance signal is then fed to a clipping circuit 44 to clip the overshoot or undershoot portion. The clipping circuit 44 clips the large amplitude portion caused by the overshoot or undershoot so as to prevent overmodulation from being generated in a frequency modulator 6 at the next stage. The luminance signal clipped at the clipping circuit 44 is fed to the frequency modulator 6 so as to frequency-modulate the luminance carrier signal with the luminance signal. The luminance signal frequency-modulated by the frequency modulator 6 is fed to a recording current level setting circuit 45 through a high-pass filter 7.

Figure 8:
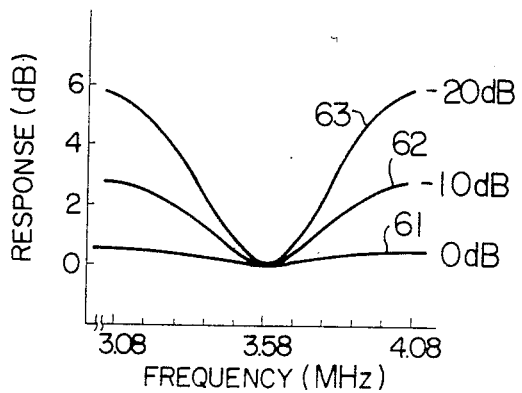
FIG. 8 is a graph illustrating the frequency characteristic of a chroma-emphasis circuit.
Figure 9:
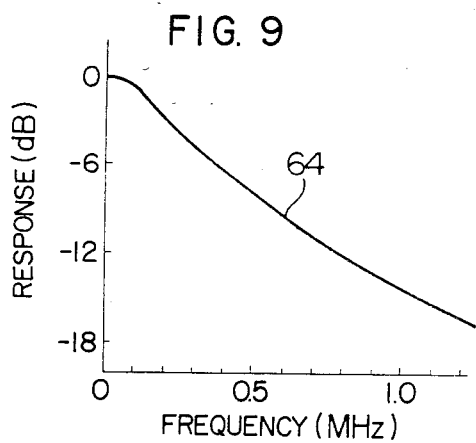
FIG. 9 is a graph illustrating the frequency characteristic of a chrominance signal recording equalizer circuit.

The composite color television signal fed to the input terminal is fed also to a band-pass filter 4 so that a carrier chrominance signal is derived therethrough. The carrier chrominance signal is then fed to a comb line filter 48 so as to delete the residual luminance signal which could not be deleted by the band-pass filter 4. The carrier chrominance signal passed through the comb line filter 48 is fed to an automatic color control circuit 49 in which the amplitude of the carrier chrominance signal is controlled. The gain of the control circuit 49 is controlled by a control signal produced by an amplitude detector 50 so as to control the amplitude of the carrier chrominance signal to be a predetermined value. Further, the amplitude detector 50 detects the amplitude of a color burst signal contained in the synchronizing signal to produce the control signal corresponding to the detected amplitude of the burst signal. The carrier chrominance signal the amplitude of which has been controlled by the automatic color control circuit 49 is fed to a burst emphasis circuit 46 in which only the burst signal is emphasized by about 6 dB. The carrier chrominance signal is then fed to a chrominance emphasis circuit 47 from the burst emphasis circuit 46. The chrominance emphasis circuit 47 is a dynamic emphasis circuit having the emphasis characteristic as shown by curves 61, 62 and 63 in FIG. 8. The emphasis circuit 47 emphasizes the signal amplitude of high band component in the right and left side bands with the chrominance subcarrier frequency 3.58 MHz as its center frequency and effects large emphasis when the input level is low. Reference numeral 9 denotes a frequency converter 9 for converting the subcarrier frequency of the chrominance signal from 3.58 MHz to $(47+\frac{1}{4}\pm\frac{1}{2}) f_H$. Reference numeral 51 denotes a conversion carrier generator which produces a carrier having a frequency of $\{3.58 \text{ MHz} + (47+\frac{1}{4}\pm\frac{1}{2}) f_H\}$. The output signal of the conversion carrier generator 51 is fed to the frequency converter 9 and mixed with a subcarrier thereat so as to convert the subcarrier frequency into $(47\pm\frac{1}{2}) f_H$. Reference numeral 10 denotes a low-pass filter 10 for deriving only necessary chrominance signal out of the output signal of the frequency converter 9 and 52 denotes a chrominance signal recording equalizer circuit having the characteristic as shown in FIG. 9.

An aural signal fed to an input terminal 2 is then fed to a compressor circuit 55 for improving the dynamic range and the dynamic range is compressed thereat. Reference numeral 11 denotes an audio emphasis circuit, 12 denotes a frequency modurator, 13 denotes a band-pass filter for suppressing unnecessary signals, 56 denotes a pilot signal generator, and 57 denotes a low-pass filter for eliminating unnecessary signals. The pilot signal generator 56 generates a pilot signal for controlling the travelling speed of a magnetic tape such that a video head can accurately scan a video track in reproducing in a magnetic recording/reproducing apparatus of the herical scanning type. Particularly, the pilot signal includes four pilot signal components which are different from each other and recorded on the video track.

The carrier chrominance signal passed through the equalizer circuit 52, the aural signal passed through the band-pass filter 13 and the pilot signal passed through the low-pass filter 57 are fed to a mixer circuit and frequency-multiplexed thereat. The pilot signal is multiplexed in the frequency band lower than the lower side band of the carrier chrominance signal. The thus frequency-multiplexed three signals are fed to a second recording current setting circuit 54 to be adjusted at the same time to their optimal recording current level. A recording processing circuit 14 is supplied with the respective output signals of the first and second recording current level setting circuits 45 and 54 so that the luminance signal, the carrier chrominance signal, the aural signal and the pilot signal are frequency-multiplexed thereat. The frequency-multiplexed signals are applied to two video heads 16 and 16' through rotary transformer 58 and 58', respectively, and recorded on the video track of a magnetic tape.

Figure 7:
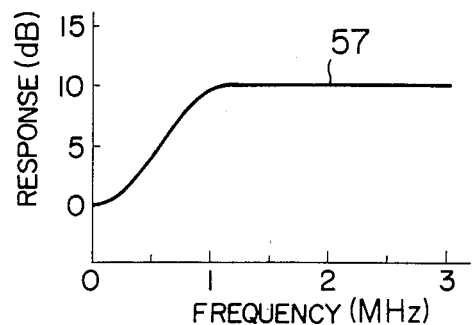
FIG. 7 is a graph illustrating the frequency characteristic of a main emphasis circuit.

In the recording circuit as shown in FIG. 6, since the video emphasis circuit 5 and the main emphasis circuit 43 have the emphasis characteristic for emphasizing the luminance signal such that, as shown in FIGS. 5 and 7, the amplitude becomes constant with respect to the signal frequency higher than 1 MHz, the lower side band of the frequency-modulated luminance signal is not emphasized so as to prevent the lower side band from extending into the frequency band of the aural signal. Accordingly, the luminance signal may be prevented from interfering with the aural signal. Further, since the frequency characteristic corresponding to the width from the synchronous tip to the white peak is flat, the amplitude of the recording current of the luminance signal becomes constant. Further, the dynamic range of the aural signal fed to the input terminal 2 is compressed by the compressor 55. That is, the aural signal is attenuated at its portion at which its signal level is large to reduced the signal level or, alternatively, it is amplified at its portion at which the signal level is low to increase the signal level so as to reduce the difference in level between the maximum and minimum values thereof, so that when the frequency-modulation is performed in the frequency modulator 12, the frequency deviation is reduced, the frequency band occupied by the aural signal side band is made narrow, the aural signal is prevented from being mixed into the luminance signal as well as the carrier chrominance signal, and the aural signal can be prevented from interfering with the video signal. Further, the frequency-converted carrier chrominance signal is compressed by the equalizer circuit 52 at its high frequency band with the characteristic as shown in FIG. 9. Accordingly, the upper side band of the carrier chrominance signal is suppressed so that it is prevented from being mixed into the aural signal.

Figure 10:
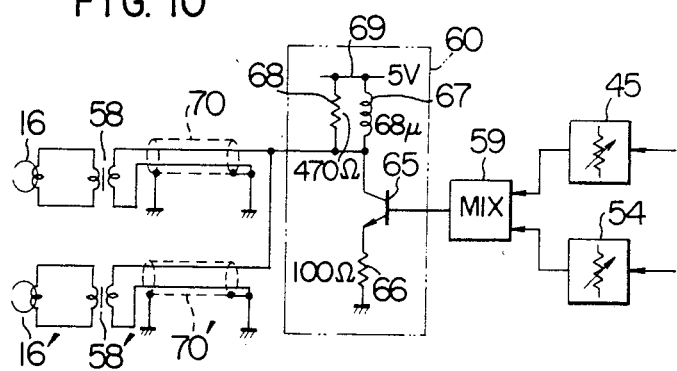
FIG. 10 is a diagram illustrating a constant current driving circuit.

The recording processing circuit 14 is constituted by a mixing circuit 59 and a constant current driving circuit 60, as seen in FIG. 10. The mixing circuit 59 is supplied with the respective outputs of the first and second recording current level setting circuits 45 and 54 and mixes these signals to each other to frequency-multiplex the luminance signal, the carrier chrominance signal, the aural signal and the pilot signal. The output signal of the mixing circuit 59 is applied to the base electrode of a driving transistor 65 of the constant current driving circuit 60. The emitter electrode of the transistor 65 is grounded through an emitter resistor 66 and the collector electrode of the same is connected to a power source circuit 69 through a parallel circuit of an inductance 67 and a resistor 68. The collector electrode is also connected through shielding wires 70 and 70' to the respective primary windings of the rotary transformers 58 and 58'. The inductance 67 constitutes a resonance circuit together with the inductances of the rotary transformers 58 and 58', the inductances of the video heads 16 and 16', and stray capacitances of the video head circuit such that the resonance frequency of the resonance circuit is selected to a value in the vicinity of the center frequency of luminance signal carrier frequency and that the Q-value of the resonance circuit is adjusted by the resistor 68 to make flat, over the entire band, the frequency characteristic of the output signal of the constant current driving circuit 60. In this manner, the amplitude of at least the luminance signal among those signals contained in the composite signal recorded by the magnetic heads 16 and 16' is made constant and therefore the amplitude of the aural signal recorded by using the luminance signal as the bias current is also made constant so that the video buzz noises are prevented from occurring.

Figure 11:
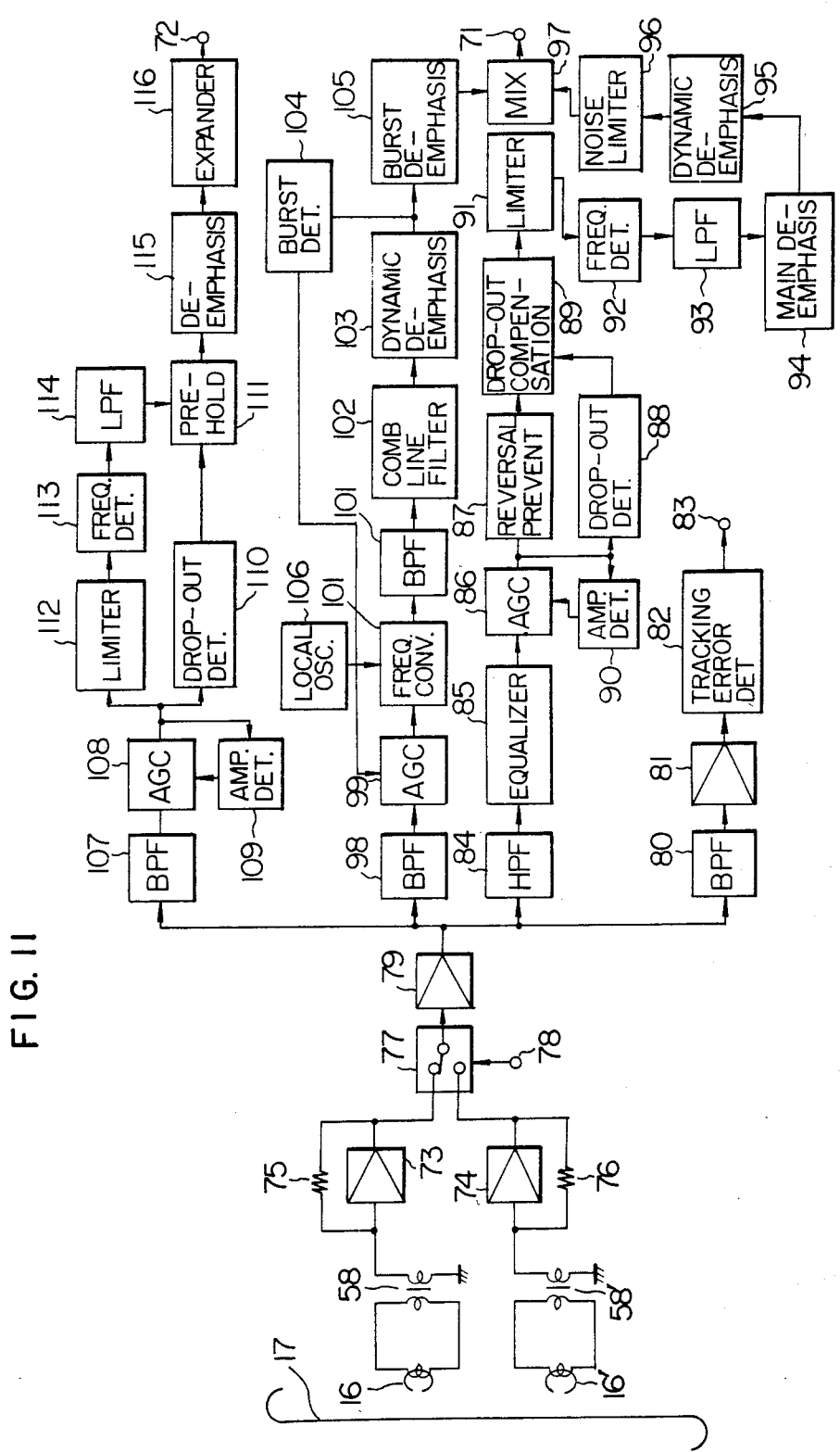
FIG. 11 is a block diagram illustrating an embodiment of the reproducing circuit in the magnetic recording/reproducing apparatus according to the present invention.

FIG. 11 is a block diagram illustrating an embodiment of a reproducing circuit of the magnetic recording/reproducing apparatus. In FIG. 11, reference numeral 71 denotes a video signal output terminal, 72 denotes an aural signal output terminal and 73 and 74 denote a first and a second pre-amplifier. In reproducing, a video signal, an aural signal and a pilot signal recorded on a recording tape 17 is reproduced by a pair of video heads 16 and 16'. The video heads which are used in the recording circuit may be commonly used as those heads 16 and 16' to be used in the reproducing circuit, or a pair of video heads 16 and 16' separately provided for only the reproducing circuit are used. The reproducing outputs of the video heads 16 and 16' are applied to the pre-amplifiers 73 and 74 through a pair of rotary transformers 58 and 58' respectively. The pre-amplifiers 73 and 74 are constituted by negative feedback amplifiers having negative feedback resistors 75 and 76 respectively so as to amplify the respective output signal of the heads 16 and 16' and damp the Q-value of the resonance circuit constituted by the heads 16 and 16' to thereby obtain a constant amplitude over the entire frequency band. Reference numeral 77 denotes a switching circuit responsive to a head switching signal applied to a control terminal 78 for alternately selecting the two pre-amplifiers 73 and 74 to connect the respective outputs of the video heads 16 and 16' to each other to obtain a continuously by connected signal. Reference numeral 79 denotes a buffer amplifier which is connected at its output terminal to four filters 80, 84, 98 and 107. The filter 80 is a band-pass filter which has a pass band of 100 kHz–170 kHz to allow only the pilot signal to pass therethrough among the signals contained in the frequency-multiplexed composite signal. The thus passed pilot signal is fed through a buffer amplifier 81 to a tracking error detecting circuit 82 which produces a tracking error signal at an output terminal 83 when the scanning by the video heads 16 and 16' come off from the video track on which the signals have been recorded in recording.

The filter 84 is a high-pass filter which serves to derive the luminance signal and the output signal of which is applied to an automatic gain control circuit 86 through an equalizer circuit 85. The automatic gain control circuit 86 makes constant the amplitude of the luminance signal on the basis of a control signal of an amplitude detector 90 so as to adjust the outputs of the two video heads 16 and 16' to be a predetermined value. The luminance signal with its amplitude made constant is fed to a reversal preventing circuit 87 and a drop-out detector 88. The reversal preventing circuit 87 serves to remove an AM component out of the luminance signal and may be constituted by such as a limiter circuit. The drop-out detector 88 detects the envelope of the luminance signal to detect the drop-out of the luminance signal so as to apply a control signal to a drop-out compensation circuit 89 upon the occurrence of drop-out. The drop-out compensation circuit 89 is provided with a one-H delay line so that upon the occurrence of drop-out, the luminance signal one-H before is derived from this one-H delay line to substitute the drop-out portion by the thus drived delayed luminance signal. A limiter circuit 91 serves to delete the AM component and the pulsatory noises in the luminance signal and apply the luminance signal to a frequency detector 92. The luminance signal detected by the FM detector 92 is fed through a low-pass filter 93 to a main de-emphasis circuit 94 in which the emphasis given to the luminance signal when it was recorded is debased and then applied to a dynamic de-emphasis circuit 95. The dynamic de-emphasis circuit 95 has the characteristic opposite to the dynamic emphasis characteristic as shown in FIG. 5 and attenuates the signal having a small amplitude in the high frequency to expand the dynamic range. A noise limiter circuit 96 serves to suppress the signal having a small amplitude in the high frequency of the luminance signal to improve the S/N ratio. Reference numeral 97 denotes a mixing circuit.

The filter 98 is a band-pass filter for deriving the carrier chrominance signal which is then fed to an automatic gain control circuit 99. The automatic gain control circuit 99 is controlled by a control signal applied from a burst detector 104 and makes the amplitude of the burst signal a predetermined value. A frequency converter 100 is supplied with an oscillation signal from a local oscillator 106 and the carrier chrominance signal from the automatic gain control circuit 99 and mixes these signals to convert the frequency of the subcarrier signal of the carrier chrominance signal into, for example, 3.58 MHz. The frequency-converted carrier chrominance signal is fed through a band-pass filter 101 to a comb line filter 102 in which a crosstalk component is removed. The crosstalk component is a chrominance signal mixed into from an adjacent track on the magnetic tape in reproducing and may be deleted by the comb line filter 102. Reference numeral 103 denotes a dynamic de-emphasis circuit having the characteristic opposite to the dynamic emphasis characteristic as shown in FIG. 8 and the emphasis given in recording is debased here to recover the original state. Referecne numeral 105 denotes a burst deemphasis circuit for attenuating only the burst signal by about 6 dB. The carrier chrominance signal passed through the burst de-emphasis circuit 105 is fed to the above-mentioned mixing circuit 97 and mixed with the luminance signal thereat so as to recover the original composite color television signal which is then produced from the output terminal 71.

The filter 107 is a band-pass filter for deriving the frequency-modulated aural signal which is then fed to an automatic gain control circuit 108. The automatic gain control circuit 108 is controlled by a control signal derived from an amplitude detector 109 and adjusts the respective amplitudes of the signals reproduced by the two video heads to make equal to each other. The output of the automatic gain control circuit 108 is fed to a drop-out detector 110 and a limiter circuit 112 so that pulsatory noises are deleted in the limiter circuit 112. Reference numeral 113 denotes a frequency detector for detecting the frequency-modulated aural signal to obtain an audio frequency signal which is then fed to a pre-hold circuit 111 through a low-pass filter 114. The drop-out detector 110 detects the envelope of the frequency-modulated aural signal and applies a control signal to a pre-hold circuit 111 when drop-out occurs. The pre-hold circuit 111 holds a signal voltage of the aural signal fed from the low-pass filter 114 immediately before the occurrence of drop-out so as to suppress noises generated when drop-out occurs. The aural signal is produced from the output terminal 72 through a de-emphasis circuit 115 and an expander circuit 116. The characteristic of the expander circuit 116 is set to be opposite to that of the compressor used in recording.

In the reproducing circuit as shown in FIG. 11, the reason why the resonance characteristic produced at the input portion of the pre-amplifiers 74 and 75 be sufficiently damped will be described. Since a magnetic tape on which a luminance signal, a carrier chrominance signal, an aural signal and a pilot signal have been recorded in the frequency-multiplexed mode, according to the present invention, is reproduced, all these signals have to be derived from the output terminal of the switching circuit 77. Here, a problem is caused in the economical point of view in that the respective signal levels are extremely different from one another and therefore even if the luminance signal is outputted with a maximum level as large as the dynamic range of amplifier allows, the reproducing level of each of the pilot signal and aural signal which have been recorded with a small level is so small that additional amplifiers are required. In an ordinary pre-amplifier, the luminance signal is provided with peaking by about 10 dB by utilizing the resonance of the input circuit. In such an arrangement, however, the respective reproducing levels of the pilot signal and the aural signal are lowered by 10 dB if the dynamic range of amplifier is taken into consideration. According to the present invention, therefore, the resonance characteristic produced at the pre-amplifiers input portion is sufficiently damped in order to compress the difference in reproducing level among the luminance signal, the aural signal and pilot signal so as make flat the amplitude characteristic in the circuit system.

In the reproducing circuit as shown in FIG. 11, the reason why the automatic gain control circuits are provided separately for the respective luminance signal system and the chrominance signal system will be described. It is necessary to compensate for drop-out in each of the luminance signal and the aural signal and to this end, it is required to accurately detect drop-out. The drop-out is followed by reduction of reproducing level and therefore it will do to detect the reduction in reproducing level in order to detect drop-out. Since there are considerable variations in reproducing level depending on the magnetic tape used, the heads used, and the circuits, it has been experimentaly found that in order to acqurately detect drop-out, it is preferable to set a threshold reproducing level which is one tenth as small as the normal reproducing level. To this end, an automatic gain control circuit is provided for the luminance signal so that the average level of output signal of each of the two video heads is controlled to be a predetermined value.

Even if the aural signal has been fed into the automatic gain control circuit for the luminance signal and derived from the output terminal of the automatic gain control circuit, the reproducing level of the aural signal could be properly controlled. Since the luminance signal has been saturation-recorded and the aural signal has been bias recorded, there is not any correlation such that when the reproducing level of the luminance signal is high, that of the aural signal is also high, between the respective reproducing levels of the aural and luminance signals. Accordingly, it is necessary to separately provide for the luminance signal and the aural signal automatic gain control circuits each provided with at its output side with a level detector for detecting drop-out.

We claim:

1. A magnetic recording/reproducing apparatus having a recording circuit and a reproducing circuit, in which an FM luminance signal obtained by frequency-modulating the luminance carrier signal by a luminance signal of a color video signal, a chrominance signal obtained by converting a frequency of a subcarrier signal of an amplitude-modulated chrominance signal to a frequency band lower than a lower side band of the FM luminance signal, and an FM aural signal which is positioned in a frequency abnd between the lower side band of the FM luminance signal and an upper side band of the chrominance signal and is obtained by frequency-modulating an aural carrier signal by an aural signal, are magnetically recorded in a frequency-multiplexed form as a composite signal on the same track of a magnetic tape and the recorded luminance signal, chrominance signal and FM aural signal are reproduced from the track of the magnetic tape, said recording circuit comprising:

a lumiance signal processing circuit including luminance signal separation means for separating said luminance signal from said color video signal, a comb line filter for deleting said chrominance signal contained in said luminance signal, and a first frequency-modulator for frequency-modulating said luminance carrier signal with said luminance signal to obtain said FM luminance signal;

a chrominance signal processing circuit including chrominance signal separation means for separating said chrominance signal from said color video signal, and a frequency converter supplied with an output signal of said chrominance signal separation means for frequency-converting the frequency of a subcarrier signal of said chrominance signal into the frequency band lower than the lower side band of said FM luminance signal;

an aural signal processing circuit including an aural signal input terminal to which said aural signal is applied, and a second frequency-modulator for frequency-modulating said aural carrier signal by said aural signal to obtain said FM aural signal; and a mixing circuit supplied with each output signal of said luminance signal processing circuit, chrominance signal processing circuit and aural signal processing circuit for frequency-multiplexing said FM luminance signal, chrominance signal and FM aural signal to provide a frequency-multiplexed composite signal for magnetic recording on the same track of the magnetic tape.

2. A magnetic recording/reproducing apparatus according to claim 1, further comprising at least one magnetic recording head for magnetically recording the composite signal on the same track of the magnetic tape.

3. A magnetic recording/reproducing apparatus according to claim 1, wherein said luminance signal processing circuit further includes a dynamic video emphasis circuit supplied with said luminance signal from said comb line filter and providing a varying amount of emphasis in accordance with a signal level of said luminance signal and a flat frequency characteristic for a frequency higher than a predetermined frequency, a main emphasis circuit supplied with an output signal of said dynamic video emphasis circuit for providing a constant emphasis to the luminance component having a frequency higher than the predetermined frequency, said first frequency-modulator being supplied with an output signal of said main emphasis circuit.

4. A magnetic recording/reproducing apparatus according to claim 3, wherein said chrominance signal processing circuit includes means responsive to the output signal of said frequency converter for providing an output signal having a decrease in amplitude in accordance with an increase in frequency and including an equalizer for decreasing the upper side band of said chrominance signal.

5. A magnetic recording/reproducing apparatus according to claim 4, further comprising a compressor circuit supplied with said aural signal for compressing a dynamic range of said aural signal in accordance with a signal level of said aural signal.

6. A magnetic recording/reproducing apparatus according to claim 5, further comprising at least one magnetic recording head for magnetically recording the composite signal on the same track of the magnetic tape.

7. A magnetic recording/reproducing apparatus according to claim 6, wherein said reproducing circuit comprises:
- a plurality of magnetic heads for reproducing said frequency-multiplexed composite signal from the recorded track of the magnetic tape;
- a plurality of pre-amplifiers respectively correspondingly connected to said plurality of magnetic heads for damping the respective resonance characteristics of said magnetic heads;
- a switching circuit for successively selecting output signals of said plurality of pre-amplifiers;
- a chrominance signal reproducing processing circuit including a first filter connected to an output terminal of said switching circuit for separating the chrominance signal from said frequency-multiplexed composite signal, and a frequency converter for converting the frequency of the subcarrier signal of said chrominance signal into its original frequency;
- a luminance signal reproducing processsing circuit including a second filter connected to said output terminal of said switching circuit for separating the FM luminance signal from said frequency-multiplexed composite signal, a first automatic gain control circuit for controlling an amplitude of said FM luminance signal, and a first frequency detector for frequency-detecting said FM luminance signal; and
- an aural signal reproducing processing circuit including a third filter connected to said output terminal of said switching means for separating the FM aural signal from said frequency multiplexed composite signal, a second automatic gain control circuit for controlling an amplitude of said FM aural signal, and a second frequency detector for frequency-detecting said FM aural signal.

8. A magnetic recording/reproducing apparatus having a recording circuit and a reproducing circuit, in which an FM luminance signal obtained by frequency-modulating the luminance carrier signal by a luminance signal of a color video signal, a chrominance signal obtained by converting a frequency of a subcarrier signal of an amplitude-modulated chrominance signal to a frequency band lower than a lower side band of the FM luminance signal, and an FM aural signal which is positioned in a frequency band between the lower side band of the FM luminance signal on an upper side band of the chrominance signal and is obtained by frequency-modulating an aural carrier signal by an aural signal, are magnetically recorded in a frequency-multiplexed form as a composite signal on the same track of a magnetic tape and the recorded FM luminance signal, chrominance signal and FM aural signal are reproduced from the track of the magnetic tape, said recording circuit comprising:
- a plurality of magnetic heads for reproducing said frequency-multiplexed composite signal from the recorded track of the magnetic tape;
- a plurality of pre-amplifiers respectively correspondingly connected to said plurality of magnetic heads for damping the respective resonance characteristics of said magnetic heads;
- a switching circuit for successively selecting output signals of said plurality of pre-amplifiers;
- a chrominance signal reproducing processing circuit including a first filter connected to an output terminal of said switching circuit for separating the chrominance signal from said frequency-multiplexed composite signal, and a frequency converter for converting the frequency of the subcarrier signal of said chrominance signal into its original frequency;
- a luminance signal reproducing processing circuit including a second filter connected to said output terrminal of said switching circuit for separating the FM luminance signal from said frequency-multiplexed composite signal, a first automatic gain control circuit for controlling an amplitude of said FM luminance signal, and a first frequency detector for frequency-detecting said FM luminance signal; and
- an aural signal reproducing processing circuit including a third filter connected to said output terminal of said switching means for separating the FM aural signal from said frequency multiplexed composite signal, a second automatic gain control circuit for controlling an amplitude of said FM aural signal, and a second frequency detector for frequency-detecting said FM aural signal.

* * * * *